United States Patent

[11] 3,631,582

[72] Inventors Jean-Claude Lucas
 Fontenay-aux-Roses;
 Andre Madin, Paris, both of France
[21] Appl. No. 703,921
[22] Filed Feb. 8, 1968
[45] Patented Jan. 4, 1972
[73] Assignee Societe Industrielle de Filtration (Sofiltra)
 Paris, France
[32] Priority Feb. 8, 1967
[33] France
[31] 94,189

[54] METHOD FOR FORMING A FILTER ELEMENT
 5 Claims, 32 Drawing Figs.
[52] U.S. Cl. ................................................. 29/419,
 29/91.1, 53/21 FW, 55/521, 83/284, 93/1 C, 93/1
 WZ, 93/84 R
[51] Int. Cl. ..................................................... B23p 19/04,
 B01d 29/06, B01d 27/08
[50] Field of Search ............................................... 55/521;
 93/84, 1 C, 36 WZ, 36 MM, 36.9, 49, 84; 83/284;
 53/21 FW,23; 156/69; 29/91.1, 419

[56] References Cited
 UNITED STATES PATENTS
| 3,346,934 | 10/1967 | Davidson | 29/91.1 |
| 3,315,336 | 4/1967 | Parker | 29/419 X |
| 3,383,751 | 5/1968 | Van Geuns | 29/419 X |
| 3,439,397 | 4/1969 | Marshak | 29/91.1 X |
| 366,188 | 7/1887 | Richards | 93/84 |
| 1,760,419 | 5/1930 | Lehmann | 53/21 FW |
| 2,726,184 | 12/1955 | Cox | 156/69 |
| 2,771,156 | 11/1956 | Kasten | 156/69 X |
| 2,890,739 | 6/1959 | Haines | 93/36.9 X |
| 2,943,700 | 7/1960 | Bub | 93/84 X |
| 3,055,277 | 9/1962 | Hagendoorn | 93/84 |
| 3,077,148 | 2/1963 | Mumby | 93/84 |
| 3,138,077 | 6/1964 | Bauder | 93/84 |
| 3,306,794 | 2/1967 | Humbert | 156/69 |
| 3,404,825 | 10/1968 | Rumberger | 93/36.9 |

FOREIGN PATENTS
| 541,171 | 5/1957 | Canada | 93/36 MM |
| 648,491 | 9/1962 | Canada | 156/69 |

Primary Examiner—Wayne A. Morse, Jr.
Attorneys—Dale A. Bauer, John L. Seymour and Bauer and Seymour ABSTRACT: Method and apparatus for forming a filter element especially useful for filtering noxious and radioactive gases. The element is composed of a ribbon of sheet filter material folded into reverse pleats. Bands or straps of flexible material are fixed to the crests of the folds in the sheet, at each side thereof, and extend longitudinally thereof, in laterally spaced relation. Transverse cuts are made in these strips at intervals regularly spaced along the pleated ribbon. Each cut is between two contiguous crests. The cuts made on one side are offset with respect to those on the other side. The pleated ribbon is then reversely folded at and along each line, to form a filter element of zigzag form. This element is then mounted within a casing having a passageway therethrough for gas to be filtered, to obturate the passageway by sealing the end and side termini of the element to the walls of the casing.

The apparatus consists of a machine operating automatically to make the aforesaid cuts. The pleated ribbon is moved in the direction of its length on and over a table. First and second rails extend transversely across the table, above and below it. Each rail carries a cutter assembly, which are spaced in the direction of travel of the ribbon. The assemblies move in unison and each makes a cut on its respective side of the ribbon to sever the bands along correctly spaced lines. At one surface of the ribbon, downstream of the cutters, means are provided to sense the cut previously made on that surface and to thereby initiate a new cutting stroke. The cutters are moved in their return or idling stroke along the rails, out of contact with the bands and the ribbon.

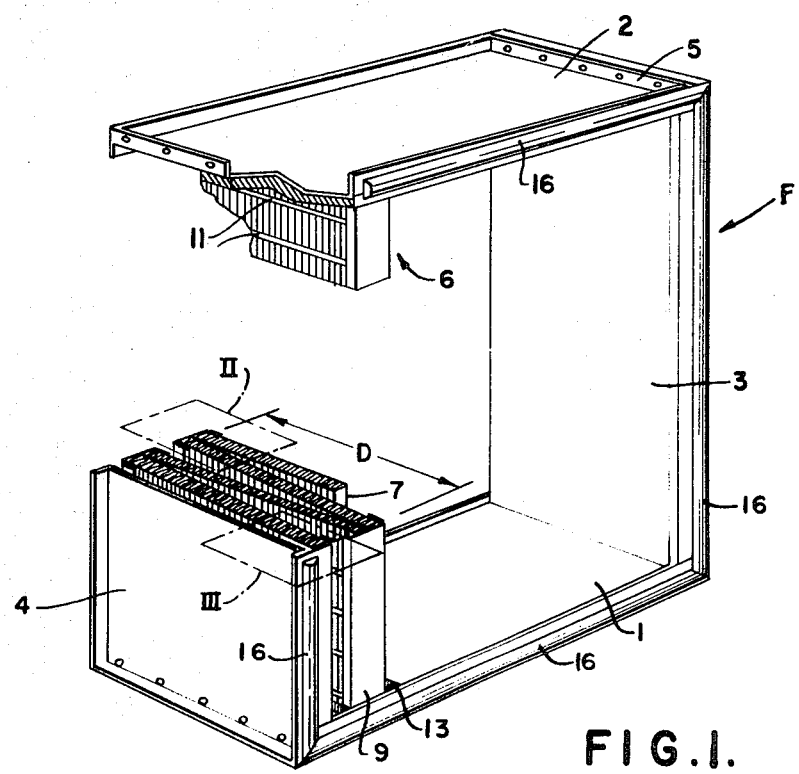
FIG.1.
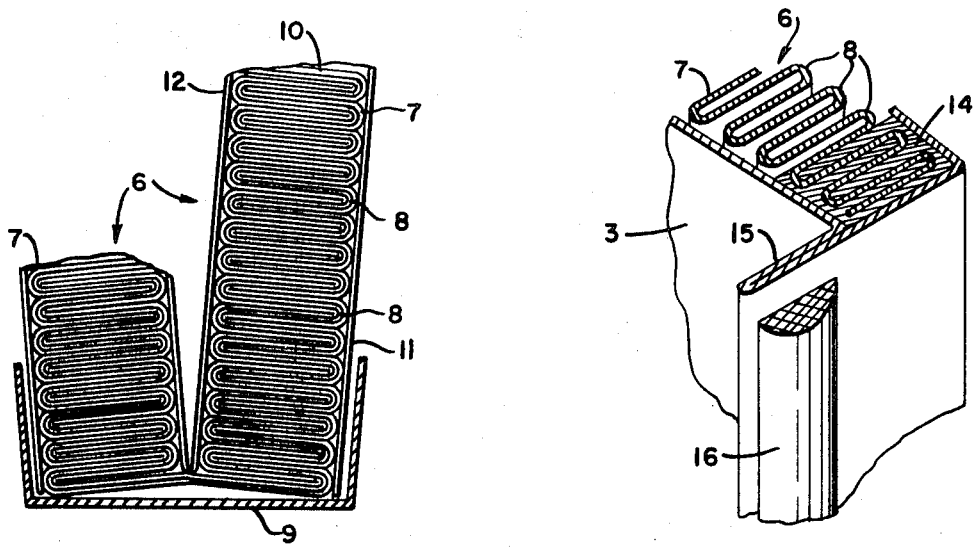
FIG.2.
FIG.3.
INVENTORS
Jean-Claude Lucas &
André Madin
BY Bauer and Seymour
ATTORNEYS INVENTORS
Jean-Claude Lucas &
André Madin
BY Bauer and Seymour
ATTORNEYS INVENTORS
Jean-Claude Lucas &
André Madin BY Bauer and Seymour
ATTORNEYS

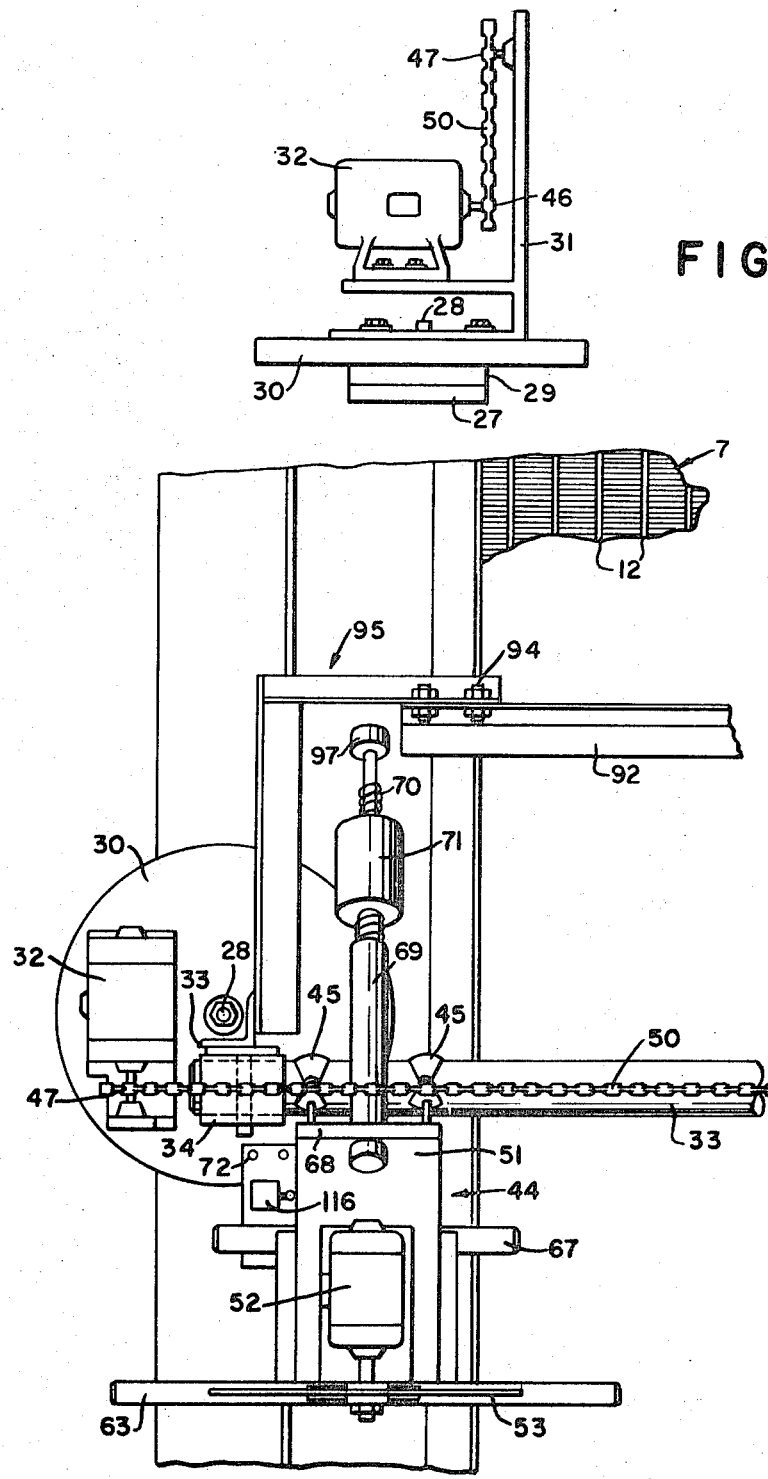

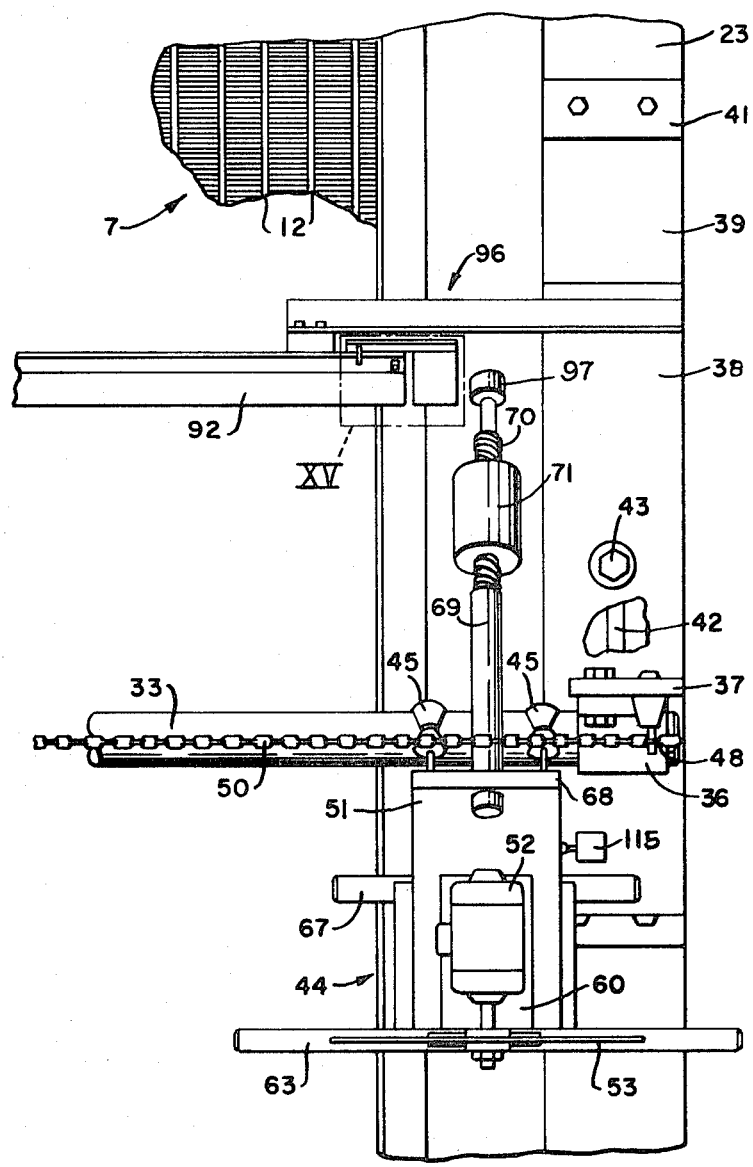
FIG.II.

INVENTORS
Jean-Claude Lucas &
André Madin

BY Bauer and Seymour
ATTORNEYS

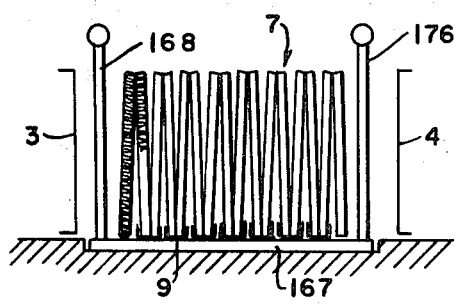
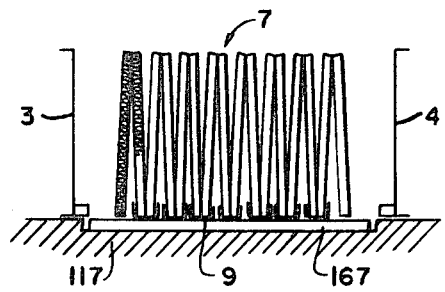
FIG. 23.  FIG. 24.
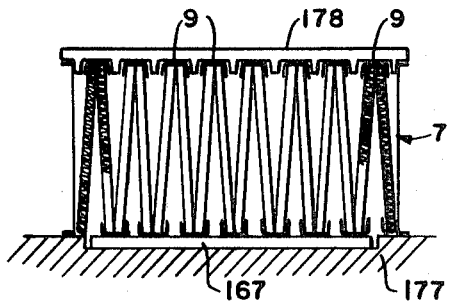
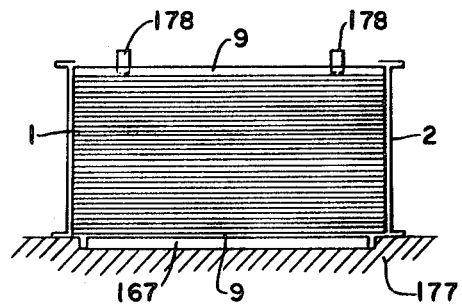
FIG. 25.  FIG. 26.
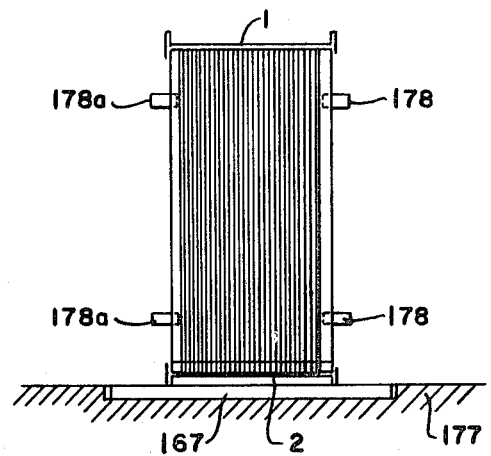
FIG. 27.
INVENTORS
Jean-Claude Lucas &
André Madin
BY Bauer and Seymour
ATTORNEYS

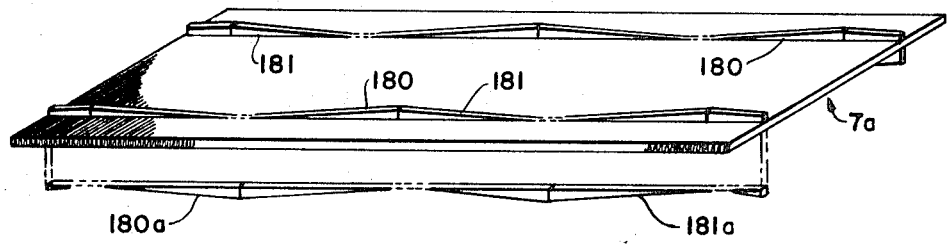
FIG. 28.
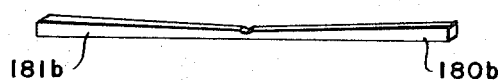
FIG. 29.
FIG. 30.
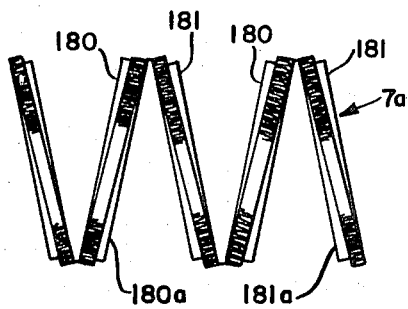     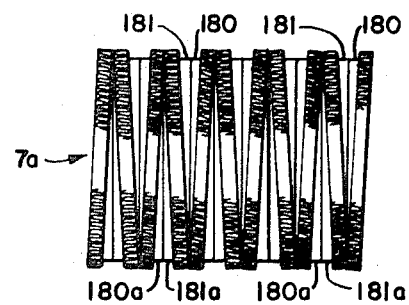
FIG. 31.            FIG. 32.

METHOD FOR FORMING A FILTER ELEMENT

This invention relates to filter units such, for example, as are used to filter noxious or radioactive gases, with high efficiency.

Previously these units were emplaced within a casing having opposite sides open, in position to obturate the passage of solid particles with the gas directed through its open sides. Each filter unit consisted of a solid open frame within which was secured a long strip of pleated sheet material, such as paper or glass fibers. The units were disposed within the casing in edge-to-edge, zigzag arrangement, to form a filtering surface of great effective area. The casing was so constructed as to be insertable within a caisson forming a permanent part of the gas flow conduit, so as to obturate the conduit to the flow of solid particles therepast.

The filter units were secured each within its respective frame, and the frames were secured along their edges in contact one with another, and with the casing, by a hardenable luting or sealing material such, for example, as polyvinyl chloride polyester, polyurethane, epoxy, cement having low shrinkage, etc. The assembly of casing, frames, sheet filter material, and the large amounts of luting compound required, resulted in an excessively heavy and expensive structure.

The present invention has a one chief object, to remedy and to overcome the foregoing drawbacks.

Ancillary to the foregoing object, it is an object to provide a filter unit wherein the aforesaid frames may be omitted, as well as large quantities of luting compound by which the discrete sheets of pleated filter material are secured, each within its own frame.

A further purpose is to provide a filter unit and method of construction thereof, which utilizes a single length of pleated filter sheet or strip, reversely bent at proper intervals or distances spaced therealong, to form the zigzag arrangement or disposition formerly effected by the contiguous frames secured in and along the casing.

Another object is to provide a machine which enables the automatic fabrication of a single length of pleated filter paper into zigzag form to completely obturate the casing.

A still further object is to provide a machine of the type aforesaid which severs at fixed predetermined intervals spaced along the length of the pleated sheet, the strips which are attached at both sides thereof, to the crests of the folds or pleats which hold the crests in properly spaced relation.

Yet another object is to provide a machine as aforesaid which operates simultaneously upon both surfaces of the pleated filter sheet, to make cuts in the strips at intervals which are properly related on the two opposite surfaces and which determine the fold lines of the sheet in the completed filter unit.

Still another object is to provide a filter until which, while highly efficient in use, is less expensive to manufacture, and lighter in weight than prior art units of like capacity, but which gives comparable and highly satisfactory service.

Other objects and advantages will become apparent to those skilled in the art, after a study of the following detailed description, in connection with the accompanying drawing.

In the drawing:

FIG. 1 illustrates in perspective, a casing or filter device constructed in accordance with the invention, parts being cut away to better show the internal construction;

FIG. 2 is a detail sectional view to an enlarged scale, and taken in the plane identified at II, FIG. 1;

FIG. 3 is an isometric view showing the construction at one corner of the casing, and taken in plane III, FIG. 1;

FIG. 9 is a detail view of a part of the machine shown in FIG. 8, looking from left to right;

FIG. 10 is a plan view of the parts shown upon FIG. 8, and to about the same scale;

FIG. 11 is a plan view of the parts of the machine included within the dot-dash square identified at XI, FIG. 7;

Figure 20:
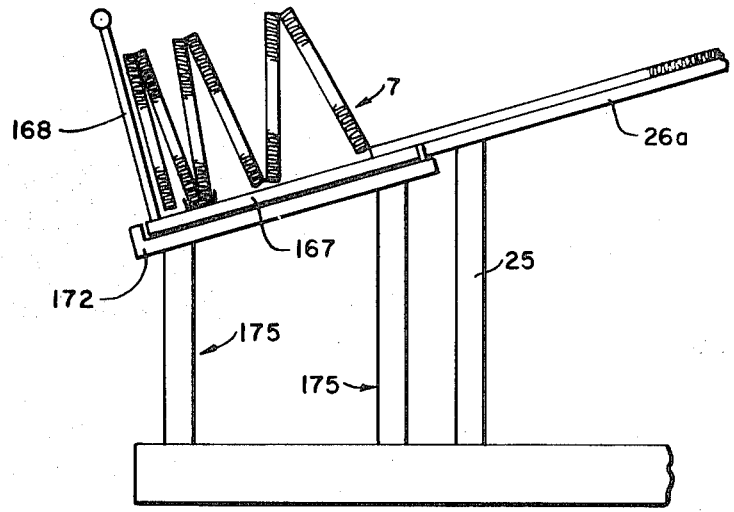
FIG. 20 shows in side elevation of portion of the machine as shown at the left end of FIg. 6, whereat the sections of pleated sheet are folded into zigzag relation preparatory to further processing.
Figure 21:
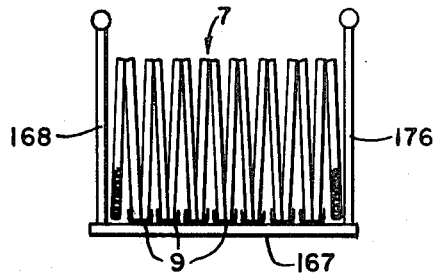
Figure 22:
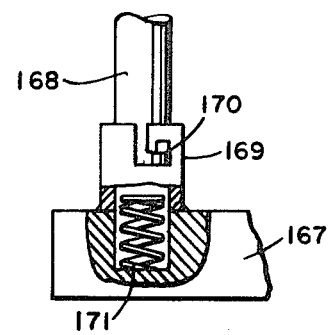

FIG. 21 corresponds generally to FIG. 20 but shows a completely processed series of folded sheet sections ready for assembly into a casing;

FIG. 22 is a detail view of the bayonet joint by which the abutment posts of FIG. 21 are removably secured in place; and FIG. 23 through 27 are detail views showing sequential steps by which the folded or Zigzag sheet is completed emplaced within its casing; and FIG. 28 is a diagrammatic view showing an alternative construction by which the folded sheet of pleated filter material may be held with its folds in properly arranged zigzag positions;

FIG. 29 is a perspective view of one form for the wedgelike elements employed in the modification of FIG. 28;

FIG. 30 is a perspective detail view wherein the wedgelike elements are discrete;

FIG. 31 is an end edge view of a portion of a sheet constructed according to FIG. 28, wherein the folding is only partially effected; and FIG. 32 is a view like FIG. 31 but showing a sheet completely folded, with contiguous wedgelike elements in face-to-face contact.

Referring in detail to FIG. 1, the filter unit F is shown as a parallelepipedal casing of sheet metal, for example, having bottom wall 1, top wall 2, and end walls 3 and 4 all rigidly united at their meetings edges by means generally identified at 5. The remaining two opposite sides of the casing are open to permit flow of gas therethrough. The casing contains a length of pleated filter paper or other material suitable for filtering, folded into equal sections of zigzag relation and arrangement, to fill the casing from one wall 3 to wall 4 and having a vertical dimension to extend from bottom wall 1 to top wall 2. As shown at FIGS. 1 and 2, the folds between contiguous sections of the elongated sheet, are encased within channel elements 9. These may be of metal or of plastic material such as "Bakelite."

At and along its top and bottom edges, at each side thereof, sheet 7 has a relatively narrow strip of flexible material 10 secured thereto. In a way obvious from consideration of FIG. 2 these strips hold and maintain the folds of sheet 7 in spaced relation. See also FIG. 3. Narrow bands or strips 11, 12, etc. are secured to and over the crests of the folds 8 of sheet 7 to assist in maintaining the folds in properly spaced relation in use. FIG. 1 shows how two of these strips such as 11, are located in spaced, horizontal, parallel relation from top to bottom of each side of the sheet.

Figure 4:
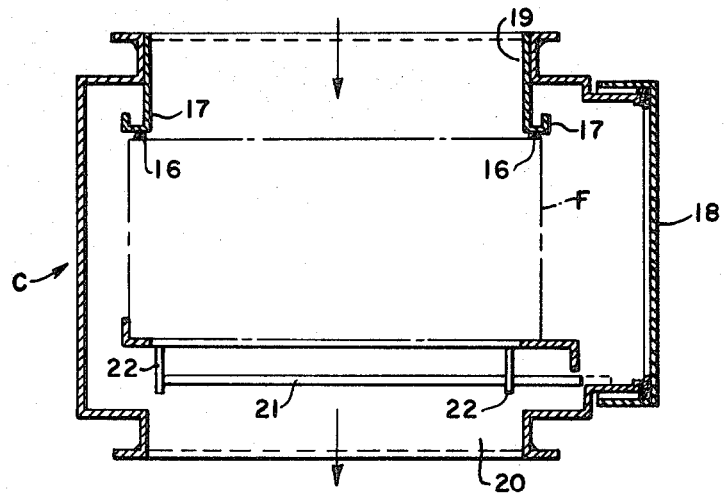
FIG. 4 is a vertical section of a caisson in which the cell or unit of FIG. 1 may be mounted and utilized, such cell being outlined in dash-dot lines.

FIG. 3 shows in detail how each of the two end edges of sheet 7 is secured in and to the casing. One end edge of each wall 3 and 4 is reversely bent, as clearly shown, to form a channel sized to receive the adjacent end edge of the sheet with a smooth fit. This is indicated at 15. Sealing compound 14 anchors the end edge of the sheet within its channel and effects a gastight joint with the casing. The reverse bend indicated at 15, in wall 3 for example, FIG. 3, serves as a rigid base for the attachment of sealing strips 16 which may be of neoprene and which, as shown upon FIG. 1, extend along and about the perimeter of one open side of the casing. Referring to FIG. 4 it is noted how these strips 16 effect gastight seal between the flanged opening 17 of caisson C, and the casing F. This caisson may be of known construction and forms an integral part of the filtering apparatus. As is known in the art, the caisson has an opening with removable cover 18, through which new filter casing may be introduced and spent casings removed. Gas flow through the caisson may be as indicated by the arrow, FIG 4, through entrance opening 19 and out through exhaust opening 20. Means including a shaft 21 journaled by bearings not shown, and manually rotatable when cover 18 is removed, carries cam 22 which engage the base of the filter casing and, in response to rotation of the shaft, force the unit or casing upwardly to press strip 16 against the flange 17 and form therewith a gastight joint.

The construction of the filter sheet 7 is described in greater detail in connection with FIG. 5. The sheet is pleated in regular folds 8. A pair of relatively narrow flexible strips 10 are secured to and along the respective surfaces of sheet 7 at the top and bottom edges thereof. Thus, one strip has a creased portion extending into and between the pleats of the sheet at one side thereof, followed by a pleat which extends along and about the outer fold of the sheet. The separation between contiguous pleats of sheet 7 is thus determined at twice the thickness of the strips 10. Other straight strips or bands of material 11 are, as previously described, secured in parallel-spaced relation across and to the crests of the folds 8 of sheet 7, to thus maintain the pleats in properly spaced relation in use.

Figure 5:
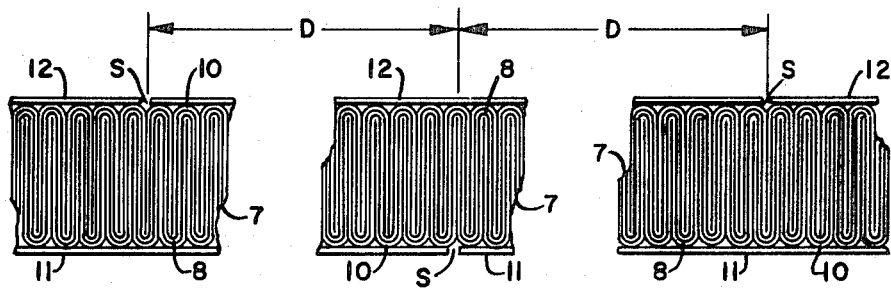
FIG. 5 is an end view of a section of pleated filter sheet, showing how cuts are made at spaced intervals in the strips which are secured in spaced parallel relation to and along the crests of the pleats in the sheet.

Since the sheet is to be folded into zigzag form, strips 11 and 12 are cut or severed, each at intervals spaced a distance 2D, FIG. 5. Further, the spacing of the cuts at one surface of sheet 7, relatively to those at the other surface, are spaced accurately by the distance D, FIG. 1.

It is one chief purpose of the machine depicted upon FIGS. 6 through 19, to automatically and accurately make these cuts S, FIG. 5, at spaced intervals along and transversely across all bands 11 and 12.

Referring in detail to the modified form of filter element, 7a, FIG. 28, identifies a sheet of pleated filter paper which may be like sheet 7, FIG. 5, and to which are attached to each side of the sheet, two longitudinally extending, laterally spaced rows of wedgelike elements 180, 181, etc. The elements of the rows on the other side of the sheet are identified at 180a, 181a, etc. In each row the elements are secured to the sheet before it is folded, in pairs, with the thicker ends of each pair together. The thinner end of the element is spaced somewhat from the thinner end of the next contiguous pair.

On one side of the sheet, each pair of wedgelike elements of one row, is transversely aligned or in registration with a corresponding pair of the other row on the same side of the sheet. But the thicker ends of the pairs of each row on the opposite side of the sheet are in transverse registration, that is, directly opposite to, the point between the thinner ends of the pairs upon the other side of the sheet. FIG. 28 shows the wedgelike element secured to the top surface of the sheet, and the corresponding lower elements as they are about to be secured to the sheet in translation normal thereto.

FIG. 30 shows two contiguous wedgelike elements 180, 181, of the form used in the species of FIG. 28. FIG. 29 shows how each pair of such elements 180b, 181b, may be constructed in one piece.

FIG. 31 shows a portion of a sheet 7a during folding. FIG. 32 shows a filter element completely folded and in condition wherein each wedge element 180 or 180a, on one pair, is in surface contact with a wedge element 181 or 181a, respectively, of the contiguous one of the next adjacent pair. In this condition of the folds of the sheet are held in proper zigzag relation, so that the desired large filtering area is presented in a relatively small volume, as and for the purpose shown at FIG. 1.

THE MACHINE

Figure 6:
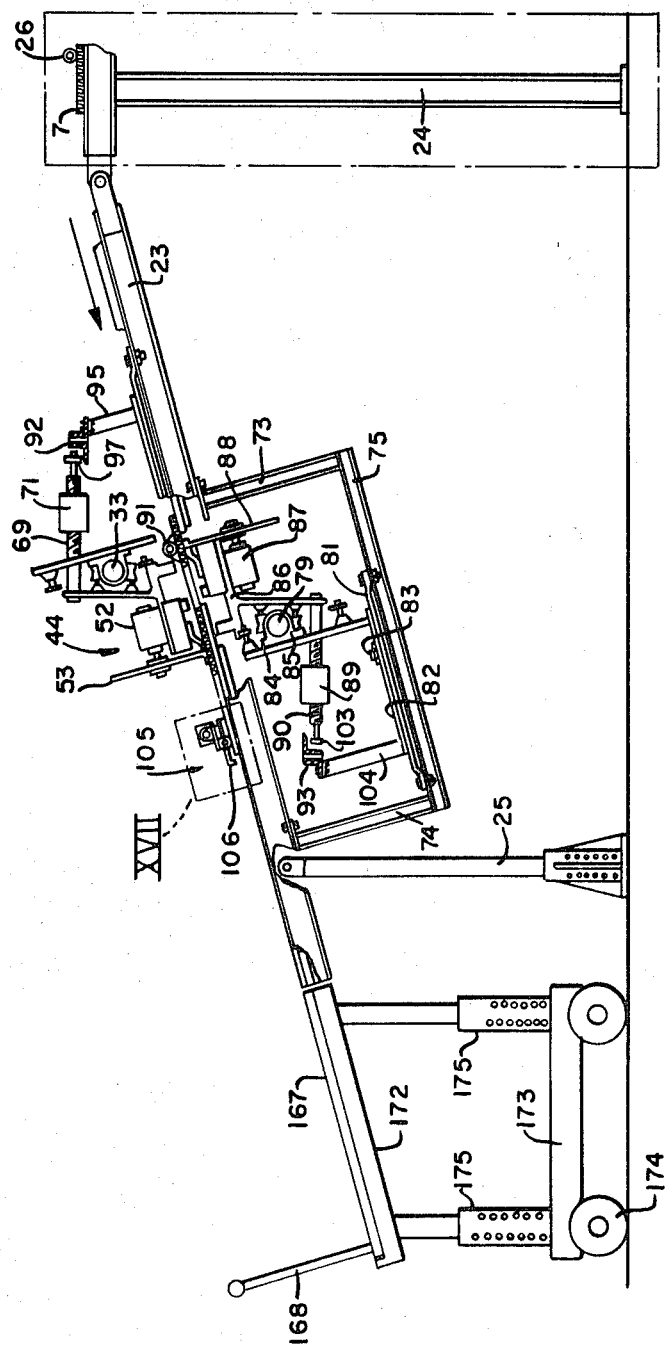
FIG. 6 is a side elevation of the machine for severing the strips at proper intervals, and for forming the sheet into zigzag form or shape.
Figure 7:
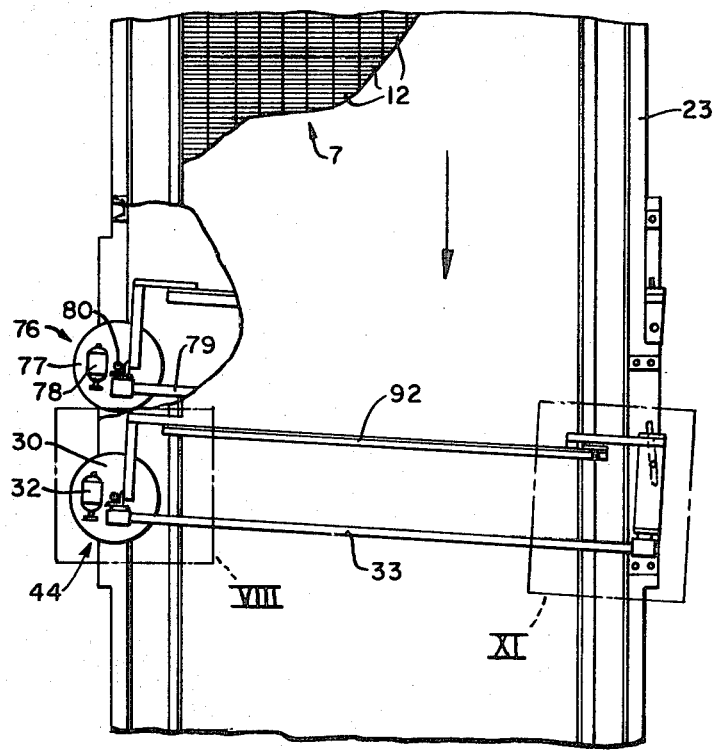
FIG. 7 is a plan view of the central portion of the machine shown upon FIG. 6.

Referring to FIGS. 6 and 7 the machine is shown in side elevation and plan, respectively. A frame or chassis 23 is supported by posts 24 and 25. Post 25 may be adjustable in length to enable the frame to be supported at a selected angle to the horizontal to thus facilitate progress of the material down the slope, right to left, FIG. 6. Power-driven means generally identified as a roller 26, operates to feed the pleated sheet 7 or ribbon to the left, as indicated by the arrow.

The frame is conveniently rectangular in plan and carries a planar platform 26a to support the pleated sheet. At the left side as viewed upon FIG. 8, a shelf forming a fixed and integral part of the frame includes a base 27. A circular plate assembly consists of a part 29 pivoted to base 27, and plate 30 fixed with part 29. Pivotal mounting of 29 and 30 on and with respect to base 27 is by means of bolt 28. Plate 30 carries a bracket 31 which, in turn, supports a motor 32 and also one end of a rail 33 which may be tubular. As best shown upon FIGS. 8 and 10, the rail is supported by a post 34 affixed to plate 30 and having a block 35 attached to its upper end and within which the adjacent end of rail 33 is fixed.

Referring to FIGS. 7 and 11 in particular, the other end of rail 33 is fixed within a block 36 attached to one side of a port 37 rising from a support 38. From FIGS. 11 and 12 it is noted that frame 23 carries a strap 39 bent downwardly at its ends, as at 40, FIG. 12, and 41, FIG. 11, and there bolted to the frame. Support 38 is mounted for sliding on and along this strap. This movement is provided for by a slot or groove, FIG. 11, formed in the strap arcuately about the axis of pivot bolt 28 at the other side of the frame, as an axis. A bolt 43 has a shank which depends into undercut slot 42 and is there provided with an enlarged head slidably fitting the undercut portion of the slot.

By the construction just described, rail 33 may be adjusted about the axis of pivot bolt 28, to a desired angle with respect to the longitudinal axis of the frame, and secured in adjusted position by tightening of bolt 43.

Figure 8:
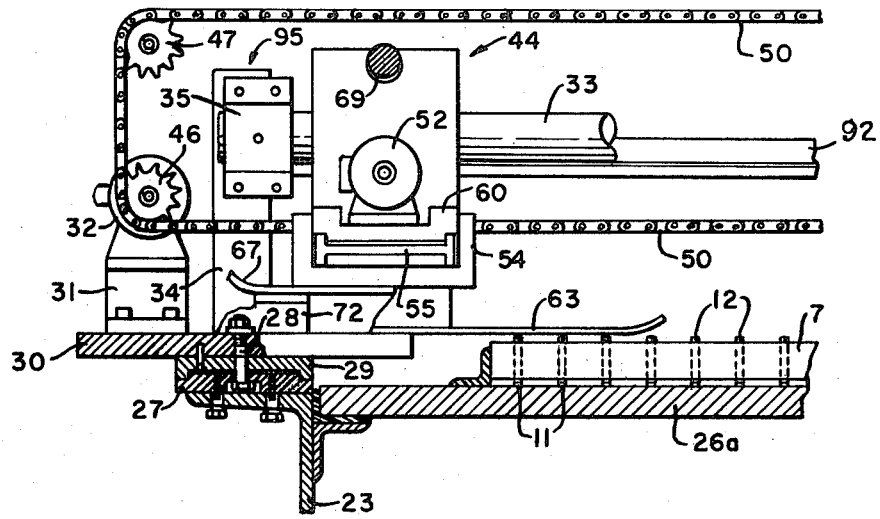
FIG. 8 is an enlarged detail view, partly in vertical section, of that part of the machine included within square VIII, FIG. 7.

A slide assembly generally identified at 44, FIGS. 8 and 10, is mounted by rollers 45 for guided translation on and along rail 33. Referring in particular to FIGS. 8 and 9, motor 32, previously described, drives a first sprocket 46. A second sprocket 47 is journaled at the top of bracket 31, directly over sprocket 46, as shown upon FIG. 9. At the other or right end of rail 33, FIGS. 11 and 12, two other sprockets 48 and 49 are journaled on post 37, in vertically spaced relation like sprockets 46 and 47. A chain 50 passes about the four sprockets and has its ends connected to slide assembly 44. Thus a motor 32 is energized and rotated in one direction or the other, it acts through the chain to translate the assembly on and along rail 33, from one side of the frame to the other.

Slide assembly 44 comprises a base 51 on which a motor 52 is fixed. A saw blade or cutting wheel 53 is attached to one end of the motor shaft.

Figure 13:
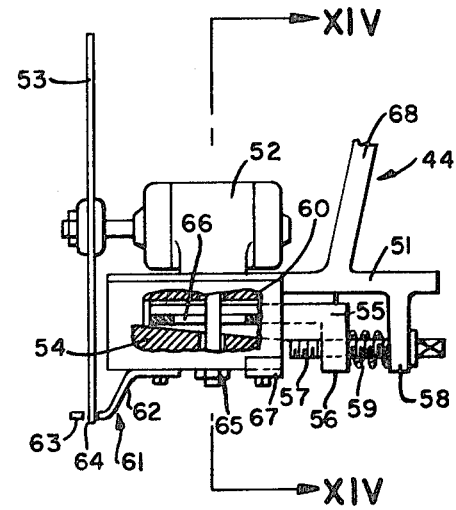
FIG. 13 shows in side elevation one of the two cutter blades and the means by which the depth of cut thereof may be adjusted.
Figure 14:
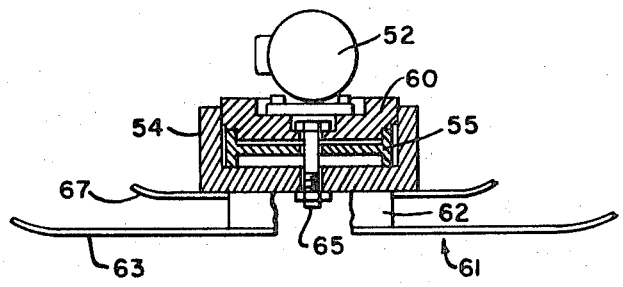
FIG. 14 is a sectional taken in plane identified at XIV—XIV FIG. 13.

FIGS. 13 and 14 shown the construction by which the aforesaid motor is mounted and vertically adjusted relatively to its base 51. A channeled block 54 fixed with base 51 has its upper surface sloping upwardly and leftwardly at a small acute angle, as viewed upon FIG. 13. An adjusting wedge 55 has upper and lower side flanges with surfaces inclined at the same angle as the surface of block 54. The base of motor 52 is mounted in a recess in the upper face of block 60. This block, in turn, slidably fits vertical guideways in and between the sides of channeled block 54. Likewise the block is rabbetted along its side edges for guiding the wedge in sliding adjustment therealong. A bolt 57 journaled in a bearing a lug 58 depending from and integral with base 51, engages a threaded hole in a second lug 56 integral with and depending from wedge 55. Thus, by turning the squared end of the bolt, wedge 55 is given a fine translation in the plane of FIG. 13 and the elevation of motor 52 on and with respect to base 51, is corresponding adjusted.

Still referring to FIGS. 13 and 14, block 54 supports from its lower surface, a gage plate having a downwardly offset portion 62 supporting an elongated ski or foot portion 63. This ski is longitudinally slotted as at 64 to receive the lower portion of the periphery of blade 53. Hence, as will be clear from the drawing and the foregoing description, the radial distance to which blade 53 may project below the level of foot or ski 63, may be precisely adjusted by turning of bolt 57, and the corresponding depth to which the blade may cut into the filter sheet may be adjusted and limited, for the purpose subsequently explained.

A bolt 65 has a head within a central recess in the top of block 60. See FIG. 14. This bolt extends through an elongated slot 66 in the central web portion of wedge 55, passes through a hole in block 54 and has a nut threaded on its lower end. Thus by tightening the nut, the wedge may be frictionally locked in the desired position to which it has been adjusted by bolt 57. As also seen at FIG. 14, the ends of foot or ski portion 63 are turned slightly upwardly to form a slide. A second but shorter auxiliary ski 67, with upturned ends, is attached to the bottom of the block 54 rearwardly of and parallel to ski 63, for a purpose to be described.

The rollers mounting slide assembly 44 for translation on and along rail 33 have been mentioned. From FIGS. 10, 11 and 12 it is seen that these are of frustoconical form and are journaled in coaxial pairs, apex to apex, with two pairs above, and two pairs below, the rail, and spaced therealong. Thus in a way clear from inspection of the figures, particularly FIG. 12, the assembly may not only be translated along the rail by energization of reversible motor 32, but may also have limited angular movement about the axis of the rail.

Figure 12:
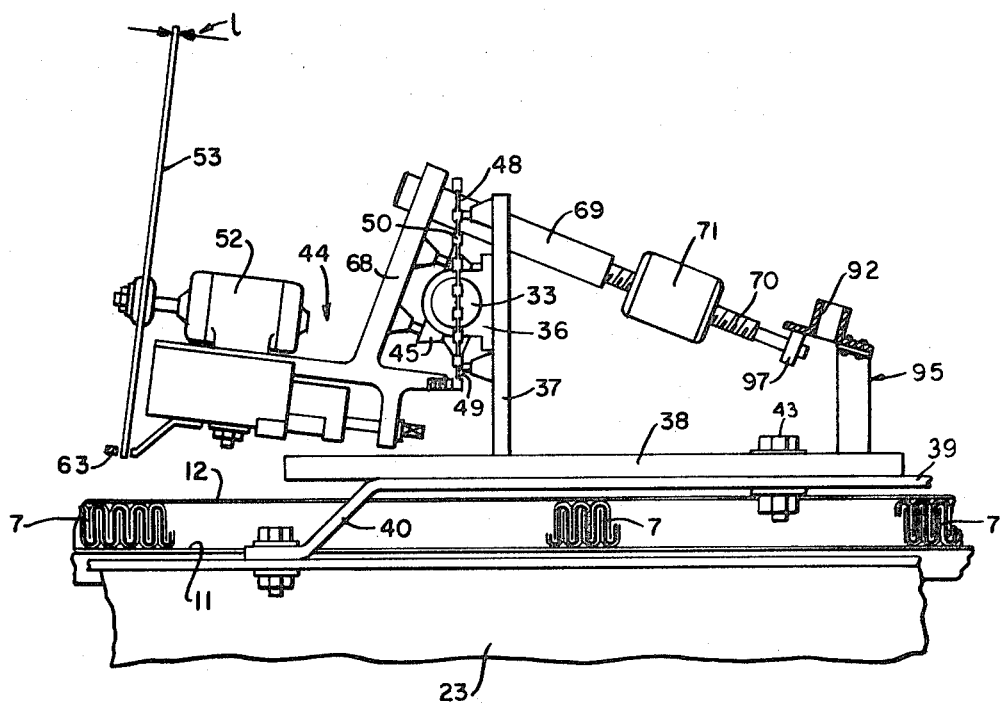
FIG. 12 is an elevational view of the parts shown upon FIG. 11; looking from the right thereof.

From FIGS. 11, 12 and 13 it is noted that base 51 has an integral upwardly and rearwardly sloping arm 68 from the upper and distal end of which a shaft 69 projects rearwardly and downwardly. The reduced end of this shaft is threaded as at 70 to receive a threaded counterweight 71. Normally the counterweight will be so adjusted that assembly 44 tends to pivot counterclockwise about the axis of rail 33, from the position shown upon FIG. 12 wherein blade 53 is out of contact with sheet 7, to the cutting position shown at FIG. 13.

In its position of repose the assembly 44 which includes motor 52, is at the left of rail 33 as seen in FIG. 8. In this position the assembly is conveniently supported, as shown in the figure, by the left end of auxiliary ski 67 resting on an abutment 72 fixed to plate 30. At the other extremity of its path of movement along rail 33, a position shown upon FIG. 11, the assembly is supported by the right end of the ski as it rests upon support 38 or a part, not shown, fixed thereto.

FIG. 7 shows rail 33 inclined downwardly and to the right. The angle of inclination effected and releasably secured by tightening of bolt 43, FIG. 11, is determined by a combined function of the speed with which motor 52, when energized, translates assembly 44 along rail 33, and the speed with which the pleated filter sheet is fed downwardly on table or support 26a. This angle will be $\theta = \arcsin s/v$, where $s$ is the rate of feed of the filter sheet and $v$ is the rate of travel of the assembly along the rail, so that cutter blade 53 traverses a path which is perpendicular to the longitudinal dimension of the sheet. The depth-setting of the blade with respect to and below the lower surface of gage or ski 63, in such that the blade will sever only the upper ones of bands 12, without injury to the pleated paper beneath. By means subsequently described each band 12 is severed by blade 53 in succession, closely midway between points at which the strips are attached to sequential crests of successive pleats.

Referring more particularly to FIG. 6, frame 23 has posts 73 and 74 each rigidly secured at its upper end to a longitudinal of the frame and depending therefrom. These posts support a supplemental beam such as 75.

A second assembly like 44 previously described and generally identified at 76, FIG. 7, is suspended from and beneath frame 23 by means of the aforesaid posts 73, 74. Since assembly 76 is essentially like assembly 44, already described, it is sufficient to identify circular plate 77 corresponding to plate 30, and mounted for pivotal movement about a fixed vertical axis 80. Plate 77 carries motor 78, as well as one end of a rail 79 (see also FIG. 6). Rail 79 corresponds to rail 33 of the parts located above the sheet. The other end of rail 79 is mounted for guided adjustment about axis 80, by means like that shown upon FIG. 11 for the right end of rail 33. From FIG. 6 it is noted that this mounting structure includes a strap 81 fixed to rail 75, a support 82 carrying a bolt 83, which rides in and along a slot in strap 81, coaxial of axis 80, and which when tightened, locks support 82 and all parts carried thereby, in angularly adjusted position. Of course, this position will be such that rails 33 and 79 are parallel and at the proper angle previously explained. The adjacent end of rail 79 is mounted in a block 85 fixed to one end of post 84 and which, in turn, is fixed to and rises from support 82.

The base or slide assembly 86 includes a part mounted on rail 79 for guided translation therealong and for limited angular movement about the axis thereof. Since this mounting is a duplicate of the one previously described in connection with rollers 45, etc., FIG. 11, it need not be described in detail. As in the case of assembly 44, the assembly 86 includes a motor 87 having a cutting blade 88 fixed to its shaft. Likewise as in the case of assembly 44, base 86 is translated on and along its rail 79, by motor 78, FIG. 7, having a sprocket on its shaft and driving a chain which extends over and about three other sprockets, not shown, but similar to sprockets 47, 48 and 49, and similarly mounted beneath the frame. The ends of the aforesaid chain are attached to base 86 so that energization of motor 78 translates the base, with motor 87 and its blade 88, transversely beneath and across the sheet. The blade extends through an opening in table 26a so that the upper part of its periphery may engage and cut at proper intervals, the strips 12 secured to and along the lower crests of the pleated sheet. A counterweight 89 like item 79 previously described, is threaded upon a shaft 90 having one end fixed with and extending from base 86. Thus in a way clear from inspection of FIG. 6, the counterweight may be adjusted on and along shaft 90 to normally effect clockwise pivoting of the assembly about the axis of rail 79. In this position blade 88 is downwardly out of contact with the strips 12 of sheet 7. Gage means like parts 63 and 67, FIG. 11, and similarly mounted, act respectively to vary the depth to which blade 88 may cut, and to support the assembly 86 and all parts supported thereby, when at the limits of travel over and along rail 79.

As in the case of rail 33, the angular adjustment of rail 79 about the pivot axis 80, FIG. 7, is so coordinated with the speed of translation of base 86 on and along its rail, and the rate of travel of sheet 7, that cuts made by blade 88 are, in any one stroke thereof, perpendicular to the longitudinal dimension of the sheet. Further, blade 88 is spaced from blade 53, in the direction of travel of the sheet, so that cuts made by the two blades in moving simultaneously on and along their respective rails, are spaced by the distance D, FIG. 5. It is important to note that a backing roller 91, FIG. 6, is journaled in suitable bearings directly over and along the path of blade 88. The bearings may be adjustable so that the roller may be adjusted to the same angle as, and parallel with the rail 79. Since it passes with a smooth fit beneath roller 91, sheet 7 is thereby held against any movement otherwise caused by the upward urge of the blade thereon.

At the termination of the cutting stroke in unison, assemblies 44 and 86 are at the right, in the position shown at FIG. 11 for assembly 44. Since during their return strokes or translation the blades must be pivoted about the axes of their respective rails 33 and 79, to move them out of operating position upon the sheet, first and second tracks 92 and 93. FIG. 6, are mounted above and below frame 23, to extend transversely thereacross, each in parallel with its rail 33 and 79, respectively. Rail 92 also appears upon FIGS. 7, 8, 10 and 11 and 12, from FIG. 10 in particular, it is noted that its left end is bolted at 94 to a bracket 95 fixed on plate 30 at about the same level as rail 33. The mounting for the right end of the track 92 appears upon FIG. 11 and consists of a bracket 96 attached to support 38.

Figure 15:
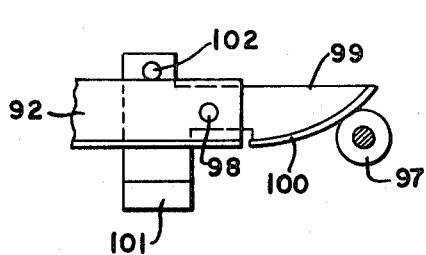
FIG. 15 is a detail view to an enlarged scale, of the means generally identified at XV, FIG. 11 and in one position, by which one cutter blade assembly is returned to starting position, following a cutting stroke, with the blade out of contact with the pleated sheet.
Figure 16:
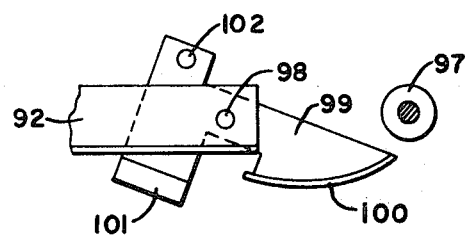
FIG. 16 is a view corresponding to FIG. 15 but showing the parts thereof in a different or second position of adjustment.

Referring more particularly to FIG. 12, it is noted that the end of threaded shaft 69 carries a roller 97, and that track 92 is so positioned and held by brackets 95 and 96 that the roller may travel along beneath and in contact with the track when assembly 44 is translated in a return stroke, on and along rail 33. Referring to FIGS. 15 and 16, at its right end, track 92 has a pivot 98 mounting thereon a cam element 99 for movement from the position of FIG. 15 to that of FIG. 16. The cam includes an arcuate surface 100 over which roller 97 is adapted to move. Cam element 99 has its center of gravity so disposed that it normally pivots freely to the position of FIG. 15, but is held by the sheet, during a cutting stroke, in the position of FIG. 16, by a depending contact portion 101.

During travel to the right, FIG. 11, on and along rail 33, in a cutting stroke, roller 97 is above track 92, and cam element 99 is held in the position of FIG. 16. But as the roller moves free of the track as shown in this figure, after a cut has been completed, the cut just made in the final one of strips 11 clears contact foot 101 so that cam 99 may pivot to the position of FIG. 15, a position to which it is limited by pin 102 thereon, engaging the top edge of the flange of track 92. In this position surface 100 is located so that when roller 97 starts its return stroke as a part of and with assembly 44, it is cammed downwardly. This results in the assembly being pivoted about the axis of rail 33 so that during the return or noncutting stroke, roller 97 rides beneath and in contact with rail 92 and, as is clear from FIG. 12, holds blade 53 out of contact with the sheet.

A like construction which holds cutting blade 88 out of contact with sheet 7 during return or noncutting stroke of assembly 86, is indicated at FIG. 6, by roller 103 and the previously described track 93, supported at one end by bracket 104. Since this construction is essentially identical with that previously described in connection with FIGS. 15 and 16, it is deemed unnecessary to describe it in detail. It suffices to say that blade 88 is held in cutting relation with strips 11 of the sheet, during its cutting stroke, and allowed to pivot to noncutting position during the return stroke as roller 103 moves free of and above, track 93.

ELECTRICAL CONTROL CIRCUITRY

Figure 18:
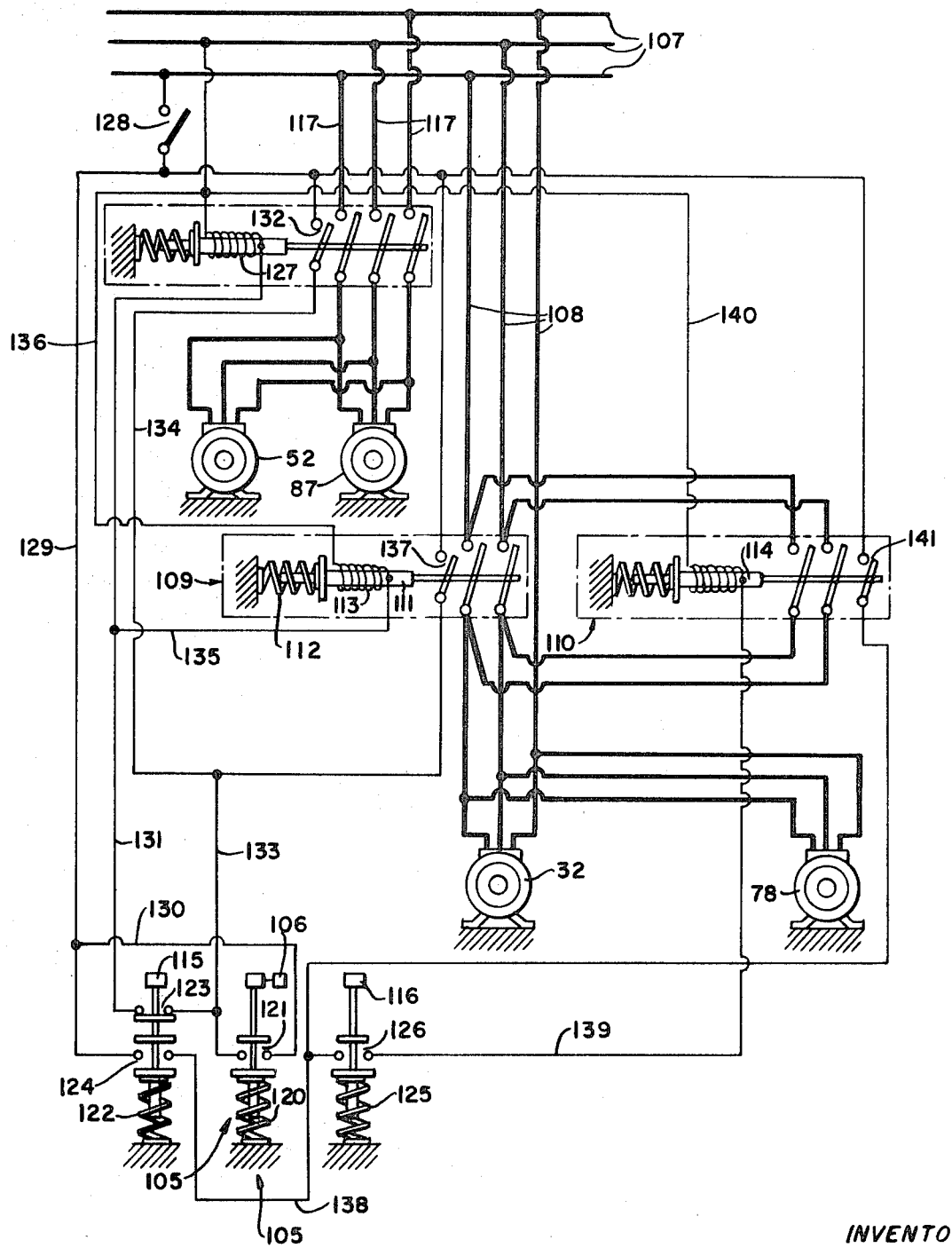
FIG. 18 is a wiring diagram of the complete machine.

Referring to FIGS. 6 and 18, a microswitch assembly 105 is mounted on a suitable support on frame 23 forwardly of assembly 44. The switch assembly includes a contactor 106 which also appears upon FIG. 18. The switch is located a distance 2D ahead of cutting blade 53. Motors 32 and 78 are connected in parallel over line 107, leads 108, and two normally open relays, forward and reverse, 109, 110, respectively. The relays are of conventional type which, as described for instrument 109 includes armature 111 urged by spring 112 to position opening its contacts, and having solenoid 113 which, when energized, shifts the armature to circuit-closing position against the urge of spring 112. The corresponding solenoid of relay 110 is identified at 114. Microswitch 115 appears also upon FIG. 11, and microswitch 116 upon FIG. 10.

Figure 17:
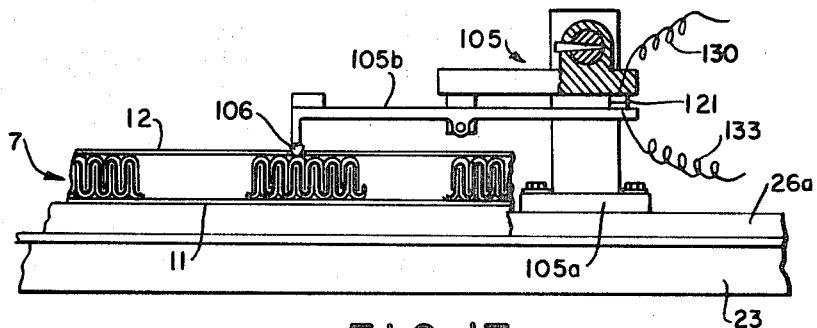
FIG. 17 is a detail view to an enlarged scale, of a contact assembly and corresponding to the parts within dot-dash square XVII, FIG. 6.

Referring to FIG. 17, switch assembly 105 comprises a base 105a bolted to table 26a and pivotally mounting an arm 105b having a feeler 106 at one end and one of contacts 121 at its other end. The remaining contact 121 is fixed to the base. Normally strip 12 engages feeler 106 and holds contacts 121 open. But when a cut in strip 12 arrives beneath the feeler, the latter drops into it and in so doing closes the contacts, to thereby connect leads 130 and 133.

When assembly 44 is at the left end of its travel as seen upon FIG. 10, base 51 engages switch 116 and holds contacts 126 closed. When as previously explained, feeler 106 drops into a previously made cut and thereby closes contacts 121, a circuit is completed from manual starting switch 128, lead 129, lead 130, contacts 121, contacts 123, lead 131, solenoid 127 of relay 118, to the other side of the line. Energization of relay 118 closes its main contacts to start cutting motors 52 and 87 and also to close holding circuit contact 132. At the same time solenoid 113 of relay 109 is energized by way of switch 128, leads 129, 130, contacts 121, 123, leads 131 and 135, solenoid 113 and lead 136 to the other side of the line. This also acts to establish a holding circuit for the solenoid, by closure of contacts 137.

Closure of the main contacts of relay 109, starts motors 32 and 78 to thereby move the respective cutting blades, each along its rail 33 and 79.

As the assembly 44 moves into its rightwardmost position, FIG. 11, base 51 engages switch 115, opens contacts 123 thereof and closes contacts 124. Opening of contacts 123 deenergizes both relays 109 and 118 by breaking the holding circuits thereof, thus stopping both cutting motors. At the same time the solenoid of relay 110 is energized through lead 129, contacts 124, lead 138, contacts 126 and leads 139 and 140. Energization of relay 110 closes its contacts to establish a holding circuit and to reverse motors 32 and 78 thus returning the cutter blades to starting position. As soon as feeler 106 drops into the next cut in strip 11, a new cycle is thereby initiated.

Figure 19:
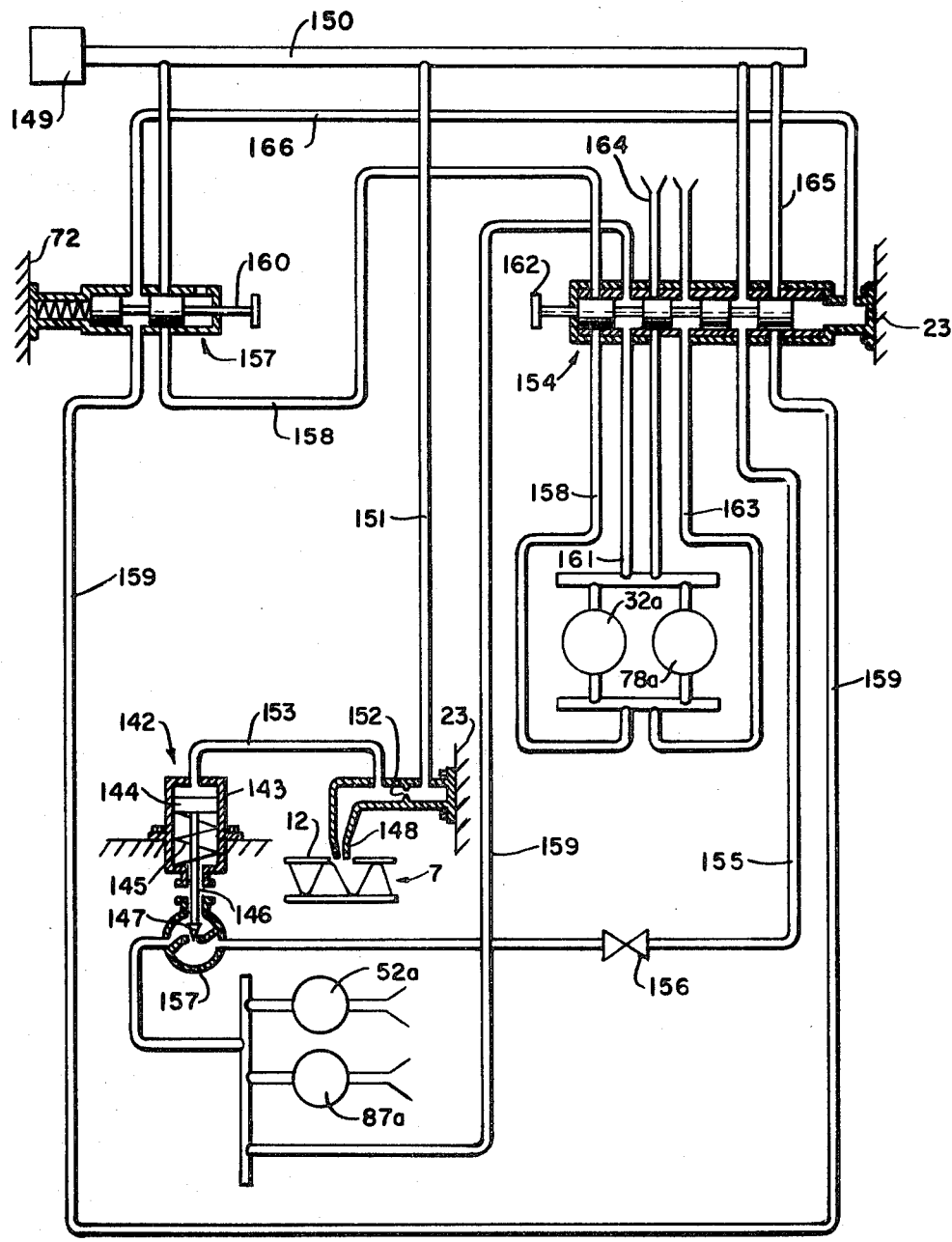
FIG. 19 is a view showing schematically the layout of a hydraulic control system for the machine and which may be used in substitution for the circuitry of FIG. 18.

FIG. 19 shows pneumatic or hydraulic circuitry which is analogous to the electric circuitry of FIG. 18, and which may be substituted therefor. In this figure, 32a and 78a indicate reversible hydraulic or pneumatic motors corresponding, respectively, to electric motors 32 and 78 of FIG. 7. Likewise, hydraulic motors 52a and 87a correspond to motors 52 and 87, FIG. 6. A valve generally identified at 142 includes cylinder 143 and piston 144, urged upwardly by spring 145. Rod 146 has a valve head 147 within casing 157. In the position shown minimum pressure effective on the top of piston 144, allows spring 145 to move the valve head to open position.

A nozzle 148 which is the functional equivalent of assembly 105, FIG. 6, and which is similarly located on and with respect to frame 23, is normally obturated by the band 12 passing therebeneath. Under this condition, fluid pressure from source 149 is effective through conduits 150, 151, restriction 152, and conduit 153, upon piston 144, and holds the valve closed. But when a cut in the band passes beneath the nozzle, pressure in valve 142 is reduced, due to the restriction, to the point where spring 145 opens the valve. Pressure fluid then flows from conduit 150, through presently open piston valve 154, conduit 155, manually or automatically operated release valve 156, valve casing 157, to motors 52a and 87a. At the same time, pressure fluid is admitted over conduits 159, presently open piston valve 154, and conduit 161, to energize motors 32a and 78a and thus to initiate a cutting stroke of the upper and lower cutting blades. Exhaust is then through conduit 163.

Abutment 72, FIG. 19, also appears upon FIG. 8, and mounts a valve 157, spring urged to the position shown wherein conduit 158 leading from pressure source 149 is cut off and conduit 159 is opened. When assembly 44 is in the position shown upon FIG. 8, it engages valve stem 160 of valve 157 and holds it in the position shown. But as soon as the assembly starts to move in a cutting stroke, it passes free of valve 157 and the latter is shifted by its spring to the rightwardmost position wherein conduit 159 is cut off and conduit 158 is opened. This shift is without effect at this time.

At the completion of the cutting stroke, assembly 44 engages the stem 162 of valve 154 and shifts it to the right. Since valve stem 160 is at this time in its rightwardmost position, shifting of valve stem to the right cuts off conduit 161 and connects motors 32a and 78a with conduit 158. These motors are thus reversed, and exhaust is through presently open conduit 164. Since conduit 155 is cut off at this time, cutting motors 52a and 87a are stopped for the reverse stroke of the cutting blade assemblies. As assembly 44 completes its travel on its return stroke, it again engages stem 160 and shifts it to the position shown. Thus connection is effected through conduit 165, presently open valve 154, conduit 159, valve 157, and conduit 166, to introduce pressure to the right end of valve 154 and to thereby shift its piston to, and hold it in the position shown. Valve or cock 156 enables the venting of any pressure in conduit 155. The system is thereby conditioned for the next stroke, when the next cut in band 12 arrives beneath nozzle 148.

As the ribbon with cut bands moves to the left, FIG. 20, off support 26a and onto supplemental support 167, the operator effects folding along the lines determined by the cuts, to form the zigzag arrangement shown, and severs the ribbon along one of the lines when the desired number of folds have been accumulated. He places a protective channel 9 beneath and along each of the lower bends of the assembly. See FIG. 21.

At this time the leading fold or section rests against the upright post 168 which, as shown upon FIG. 22, is removably held in its socket 169, by a bayonet joint 170. A spring 171 assists removal of the post and holds the joint in the locked position shown. In the preferred form, referring to FIG. 6, support 167 is mounted upon a table 172 carried by a base 173 mounted upon wheels 174. Legs 175 of the table are adjustable in length as indicated, to adjust the height of the table and to incline it so that it is, in effect, a coplanar continuation of support 26a.

After the required number of sections have been accumulated and folded, a second post 176, FIG. 23, like post 168, is inserted into its socket at the other end of support 167, to hold the assembly in folded position. The support is then rolled to a surface 177 having a recess to receive the support and of about the same depth as the thickness of the support. The parts are then as shown upon FIG. 23.

Posts 168 and 176 are removed as indicated upon FIG. 24, and end walls 3 and 4 are emplaced. The channels of these walls, presently at the lower sides thereof, are filled with a plastic, self-hardening luting compound 14, FIG. 3, such as "Araldite," or with a magnesium cement obtained by mixing calcined magnesia in a solution of concentrated magnesium chloride. The terminal edges of the end sections of the ribbon 7 are then immediately introduced each into its channel.

A pair of notched bars 178, one of which appears in FIG. 25, are then placed over the assembly to temporarily hold channeled elements 9 in position, each over its fold in the ribbon, in a way clear from inspection of the figure.

When luting compound 14 has hardened, the assembly is placed on end as in FIG. 27 and the channels 9 are temporarily held in place by bars 178 and 178a, while luting compound as aforesaid, is applied along the edges of the ribbon where it contacts walls 1 and 2. See FIG. 1. These walls are then put in place and secured by appropriate means such as are indicated at 5, FIG. 1. Sealing strip 16 is then attached to complete the unit.

The foregoing disclosure is to be taken in an illustrative rather than a limiting sense. Numerous modifications, substitutions of equivalents, and changes in sequence of steps, will readily occur to those skilled in the art, after a study of the foregoing specification. For example, the ribbon may be secured in folded form by discrete elements which may be of polyurethane or other like material, fixed or adherently secured to and along the crests of the pleats by means, for example, of an aqueous vinyl resin solution. The ribbon with its reinforcement is introduced into the parallelepipedal casing having channels 15 as previously described, which receive the end extremities of the ribbon. Since the walls of the casing prevent the unfolding of the ribbon it is possible to carry out the procedure of assembly without employing the notched bars 178, 178a.

Having fully disclosed the invention, what we claim and desire to secure by Letters Patent is:

1. The method of forming a filter element from a ribbon of sheet filter material, comprising, securing to and along the length of the sheet, at transversely spaced intervals thereacross, and on both surfaces thereof, flexible strips, pleating the sheet and strips as a unit to form reverse bends therein, so that the portions of each reverse bend of the strips are in surface-to-surface contact, securing bands to and along the crests of each said strip to interconnect the crests, at each side of the pleated ribbon, severing the bands on each side of the ribbon, along lines transversely of its length and at predetermined spaced intervals therealong, each line at one side being longitudinally offset with respect to lines at the other side, folding the pleated ribbon along each line, into zigzag form, each fold being opposite and away from the line directly opposite, placing a plurality of channels upwardly facing and in spaced parallel relation, depositing a self-hardening compound into and along each channel, and positioning the folded filter element so that each alternate fold thereof is within a respective channel and enrobed in the compound therein.

2. The method of constructing a filter element, comprising, folding a ribbon of sheet filter material into reverse pleats having alternate crests thereof essentially in respective ones of two parallel planes, affixing a plurality of laterally spaced bands to said crests in each said plane and extending transversely of said crests, severing the bands in one said plane along first spaced lines parallel with and between contiguous crests, severing the bands in the other said plane along second spaced lines parallel with and between contiguous crests, said second lines being offset along the length of the ribbon, each with respect to a sequential pair of said first lines, and folding the pleated ribbon into reverse bends at each said line, to form a zigzag filter element; and securing to each side surface of said ribbon, respectively, first and second strips, the reverse portions of each strip within each fold being superposed in face-to-face contact to thereby determine and maintain the spacing of the folds; and encasing each reverse fold of the filter element in a respective one of a plurality of channels, and sealing each fold in and to its channel.

3. The method of claim 2, mounting the filter element within a casing having walls defining a passageway for conducting gas therethrough, and sealing the end and side edge termini of the element to said walls to obturate the passageway to movement of solid particles therethrough.

4. The method of claim 1, positioning the terminal end edges of the ribbon in and along respective channels in opposite walls of a casing, and depositing hardenable sealing compound into and along each channel of the casing, to enrobe the terminal end edges of the casing therein.

5. The method of claim 4, and applying sealing compound to and along the side terminal edges of the ribbon to thereby seal the same to respective ones of two other opposite walls of the casing.

* * * * *